US008913376B2

(12) United States Patent
Wu et al.

(10) Patent No.: US 8,913,376 B2
(45) Date of Patent: Dec. 16, 2014

(54) EXPANDABLE KEYBOARD DEVICE

(75) Inventors: Wen-Chin Wu, New Taipei (TW);
Teng-Yi Chiu, New Taipei (TW);
Yen-Ting Pan, New Taipei (TW);
Yi-Sheng Kao, New Taipei (TW);
Hish-Bin Dai, New Taipei (TW)

(73) Assignee: Wistron Corporation, New Taipei (TW)

( * ) Notice: Subject to any disclaimer, the term of this patent is extended or adjusted under 35 U.S.C. 154(b) by 208 days.

(21) Appl. No.: 13/457,710

(22) Filed: Apr. 27, 2012

(65) Prior Publication Data
US 2012/0287562 A1 Nov. 15, 2012

(30) Foreign Application Priority Data

May 13, 2011 (TW) .............................. 100116842 A

(51) Int. Cl.
G06F 1/16 (2006.01)
(52) U.S. Cl.
CPC ............ *G06F 1/1626* (2013.01); *G06F 1/1616* (2013.01); *G06F 1/1632* (2013.01); *G06F 1/1662* (2013.01); *G06F 1/1669* (2013.01); Y10S 248/917 (2013.01)
USPC .................. 361/679.08; 361/679.21; 248/917
(58) Field of Classification Search
CPC ....... G06F 3/0488; G06F 1/16; G06F 1/1654; G06F 21/84; H05K 5/0017; H05K 5/0221; H05K 7/14
USPC ............. 361/679.01, 679.03, 679.08, 679.09, 361/679.21, 679.22, 679.26, 679.27, 361/679.17, 679.29; 248/917–924; 312/223.1–223.2
See application file for complete search history.

(56) References Cited

U.S. PATENT DOCUMENTS

| 5,193,069 A * | 3/1993 | Furuya ..................... 361/679.09 |
| 6,937,468 B2 * | 8/2005 | Lin et al. .................. 361/679.41 |
| 2004/0160735 A1 * | 8/2004 | Ghosh et al. .................. 361/683 |
| 2005/0111182 A1 | 5/2005 | Lin et al. |
| 2006/0007645 A1 * | 1/2006 | Chen et al. ..................... 361/681 |
| 2009/0263620 A1 * | 10/2009 | Balthes et al. ................ 428/116 |
| 2010/0238620 A1 * | 9/2010 | Fish .......................... 361/679.09 |

FOREIGN PATENT DOCUMENTS

TW 434942 11/1988

OTHER PUBLICATIONS

Taiwanese Office Action issued May 23, 2014 in Taiwanese Patent Application Serial No. 100116842 and partial English Translation.
Office Action issued in Chinese Counterpart Application No. 201110148110.9 by State Intellectual Property Office P.R.C Aug. 25, 2014.
English Translation of portions of Chinese Office Action of Aug. 25, 2014.

* cited by examiner

*Primary Examiner* — Anthony Haughton
*Assistant Examiner* — Ingrid Wright
(74) *Attorney, Agent, or Firm* — Merek, Blackmon & Voorhees, LLC

(57) ABSTRACT

An expandable keyboard device includes a keyboard, and a supporting assembly having interconnected first and second panels. The second panel is adapted to connect with an electronic device. The supporting assembly is movable relative to the keyboard between an unfolded state, where the first panel extends upwardly relative to the keyboard for supporting the electronic device above the keyboard, and a folded state, where the second panel along with the electronic device cover the keyboard. An electrical connector is disposed in the housing for electrical connection with the electronic device. A connecting unit interconnects the supporting assembly and the keyboard.

6 Claims, 16 Drawing Sheets

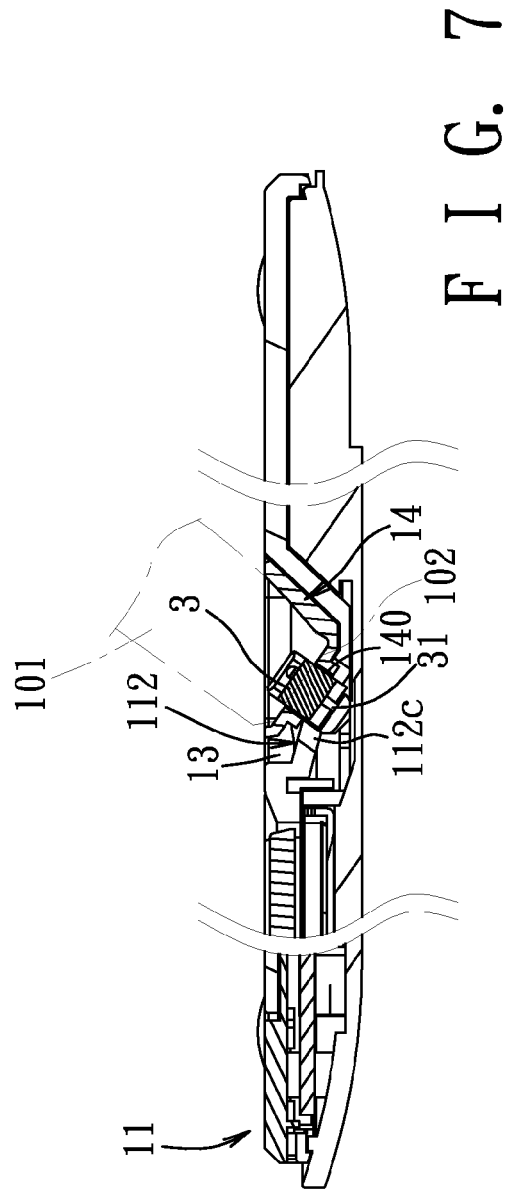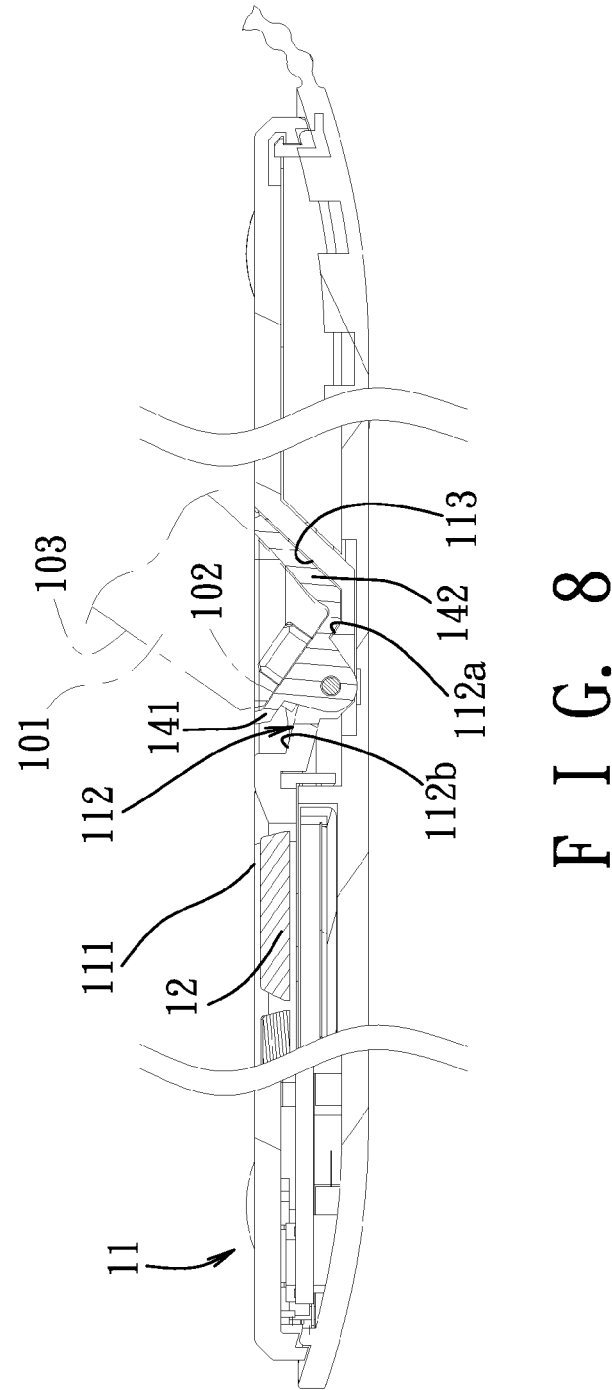

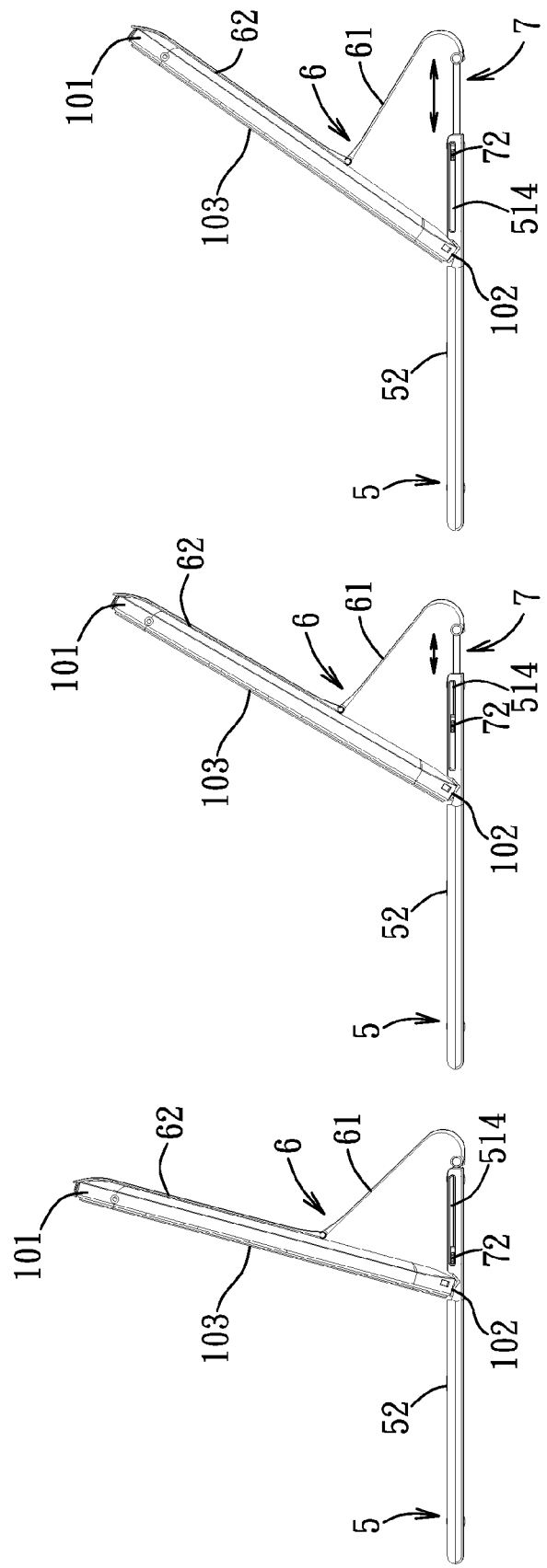

EXPANDABLE KEYBOARD DEVICE

CROSS-REFERENCE TO RELATED APPLICATION

This application claims priority of Taiwanese Patent Application No. 100116842, filed on May 13, 2011, the disclosure of which is incorporated herein by reference.

BACKGROUND OF THE INVENTION

1. Field of the Invention

This invention relates to an expandable keyboard device, and more particularly to an expandable keyboard device that is used in conjunction with an electronic device.

2. Description of the Related Art

Each of Taiwanese Patent Publication No. 434942 and Taiwanese Patent No. M245523 discloses an expansion seat that connects a portable computer (such as a tablet computer) to an expandable keyboard to facilitate use of the expandable keyboard by a user and simultaneously to support the electronic device. For example, the expansion seat disclosed in Taiwanese Patent No. M245523 includes a keyboard and a grooved frame pivoted to the keyboard. The portable computer is mounted to the grooved frame, and is movable relative to the keyboard. The grooved frame is provided with a connector for electrical connection with the portable computer.

SUMMARY OF THE INVENTION

Therefore, an object of the present invention is to provide an expandable keyboard device that has a simple and more reliable structure.

According to this invention, an expandable keyboard device is used in conjunction with an electronic device. The electronic device has a display surface and a bottom end. The expandable keyboard device comprises a keyboard, a supporting assembly, an electrical connector, and a connecting unit. The keyboard includes a housing and a plurality of keys provided on the housing. The supporting assembly includes a first panel and a second panel connected to the first panel. The second panel is adapted to connect with the electronic device. The supporting assembly is movable relative to the keyboard between an unfolded state and a folded state. The first panel extends upwardly relative to the keyboard for supporting the electronic device above the keyboard when the supporting assembly is in the unfolded state so that the bottom end of the electronic device abuts against the keyboard rearwardly of the keys and so that the display surface faces frontwardly. The second panel and the electronic device cover the keyboard when the supporting assembly is in the folded state. The electrical connector is disposed in the housing for electrical connection with the electronic device. The connecting unit interconnects the supporting assembly and the housing. The supporting assembly is movable relative to the keyboard through the connecting unit.

An advantage of this invention resides in that by using the supporting assembly in conjunction with the connecting unit, the effect of supporting the electronic device can be achieved. Further, when the electronic device is not in use, the supporting assembly along with the electronic device can be moved to cover the keyboard, so that the expandable keyboard device and the electronic device can be conveniently carried.

Further, the housing has a top face, and a receiving groove extending downwardly from the top face rearwardly of the keys. The electrical connector is disposed movably in the receiving groove. The receiving groove is adapted to receive the bottom end of the electronic device when the electronic device abuts against the keyboard. The electrical connector is adapted to mate with the bottom end of the electronic device.

Another advantage of this invention resides in that through the mobility of the electrical connector, connection between the electronic device and the electrical connector can be maintained stably.

The keyboard further includes a bearing plate pivoted to the housing and disposed in the receiving groove for supporting the bottom end of the electronic device. The electrical connector is engaged to the bearing plate so that the bearing plate can move along with the electrical connector in the receiving groove.

The housing further includes a first inclined wall and a second inclined wall both connected to and lower than the top face. The first and second inclined walls are connected to each other to form a substantially V-shaped structure that defines the receiving groove. The first inclined wall is proximate to the keys and includes a first plate section connected to the second inclined wall, and a second plate section connected to the first plate section and the top face of the housing and having a slope smaller than that of the first plate section. The bearing plate has a substantially V-shaped structure and includes interconnected first and second bearing plate portions. The first inclined wall faces the first bearing plate portion. The second inclined wall faces the second bearing plate portion. The electrical connector is engaged to the first bearing plate portion.

A yet another advantage of this invention resides in that, because the electrical connector is disposed on the bearing plate that supports the electronic device, the connection between the electronic device and the electrical connector can be further ensured.

The keyboard further includes a magnetic element proximate to the electrical connector for magnetically attracting the bottom end of the electronic device.

Still yet another advantage of this invention resides in that the magnetic element not only can function as a guide, but also can enhance stability of connection between the electrical connector and the electronic device.

The connecting unit includes a flexible sheet connected to the housing and the first panel. The flexible sheet is made of rubber, and has a wavy surface that includes a plurality of alternately arranged horizontally extending ridges and grooves.

The first panel includes a panel body and a pad body connected to the panel body. The pad body is formed integrally as one piece with the flexible sheet. The second panel is connected to the pad body through an insert injection molding process. The flexible sheet is connected to a portion of the housing through an insert injection molding process.

Further still another advantage of this invention resides in that, by using the insert injection molding method with simple structure and means, connection between the keyboard and the supporting assembly can be achieved.

The connecting unit includes a slide plate slidable forward and rearward relative to the housing. The first panel is pivoted to and movable along with the slide plate.

The housing has a rear end, a slide groove extending frontwardly from the rear end, and left and right sidewalls cooperatively defining the slide groove. One of the sidewalls is provided with a through slot that communicates with the slide groove, and has an inner wall face facing the slide groove, and a plurality of positioning recesses formed on the inner wall face and arranged along the through slot. The connecting unit further includes a resilient engaging element connected to the slide plate and extendable outwardly and resiliently through the through slot. The resilient engaging element is releasably retained in one of the positioning recesses to limit sliding movement of the slide plate relative to the housing.

The efficiency of this invention resides in that by using the supporting assembly in conjunction with the connecting unit, a different structure for supporting the electronic device can be effected. Further, when the supporting assembly is not in use, the supporting assembly along with the electronic device can cover the keyboard to facilitate carrying of an assembly of the expandable keyboard device and the electronic device.

BRIEF DESCRIPTION OF THE DRAWINGS

Other features and advantages of the present invention will become apparent in the following detailed description of the embodiments of the invention, with reference to the accompanying drawings, in which:

FIG. 7 is a fragmentary sectional view of the keyboard of the first embodiment in an assembled state;

FIG. 8 is a view similar to FIG. 7, but illustrating a bearing plate abutting against a second inclined face of the keyboard;

FIGS. 14 to 16 are schematic side views of the second embodiment in an unfolded state, illustrating the electronic device in different inclination angles, respectively;

DETAILED DESCRIPTION OF THE PREFERRED EMBODIMENTS

Figure 1:
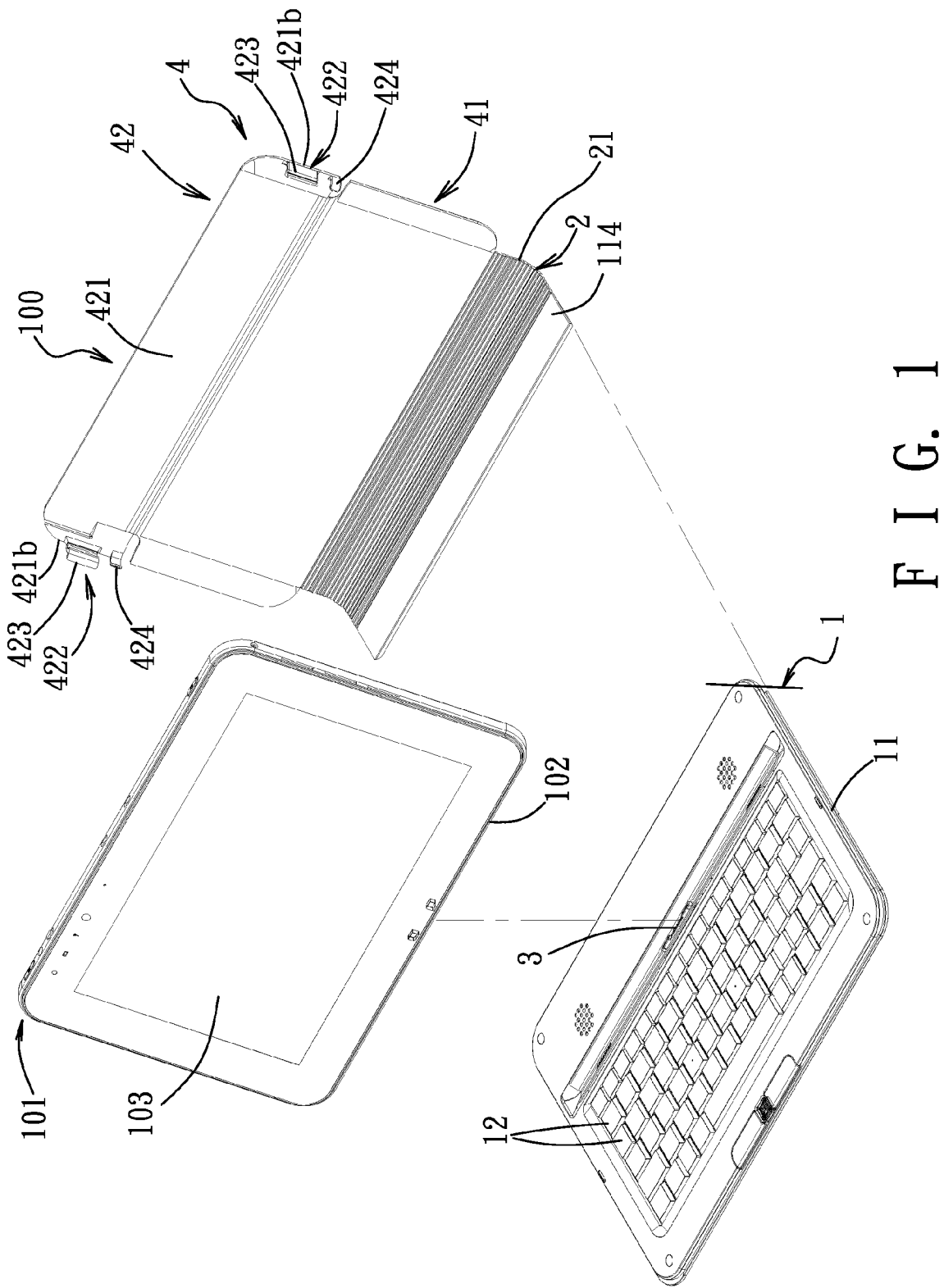
FIG. 1 is an exploded perspective view of an electronic device and an expandable keyboard device according to the first embodiment of this invention.

The above-mentioned and other technical contents, features, and effects of this invention will be clearly presented from the following detailed description of two embodiments in coordination with the reference drawings.

Before this invention is described in detail, it should be noted that, in the following description, similar elements are designated by the same reference numerals.

Referring to FIGS. 1 to 11, an expandable keyboard device 100 according to the first embodiment of the present invention is used in conjunction with an electronic device 101. In other words, the expandable keyboard device 100 is used as an expandable keyboard device of the electronic device 101. The electronic device 101 may be configured as a tablet computer having a display surface 103.

The expandable keyboard device 100 comprises a keyboard 1, a connecting unit 2, an electrical connector 3, and a supporting assembly 4.

The keyboard 1 includes a housing 11 and a plurality of keys 12 provided on the housing 11. The supporting assembly 4 includes a first panel 41 and a second panel 42 connected to the first panel 41. The connecting unit 2 interconnects the first panel 41 and the housing 11, and is movable relative to the housing 11. Hence, through the connecting unit 2, the supporting assembly 4 is movable relative to the housing 11 between an unfolded state (see FIGS. 3 to 5) and a folded state (see FIG. 2). The electronic device 101 can be connected to the second panel 42 through an interlocking means, a releasable adhesive, or any other simple releasable connecting means.

Figure 2:
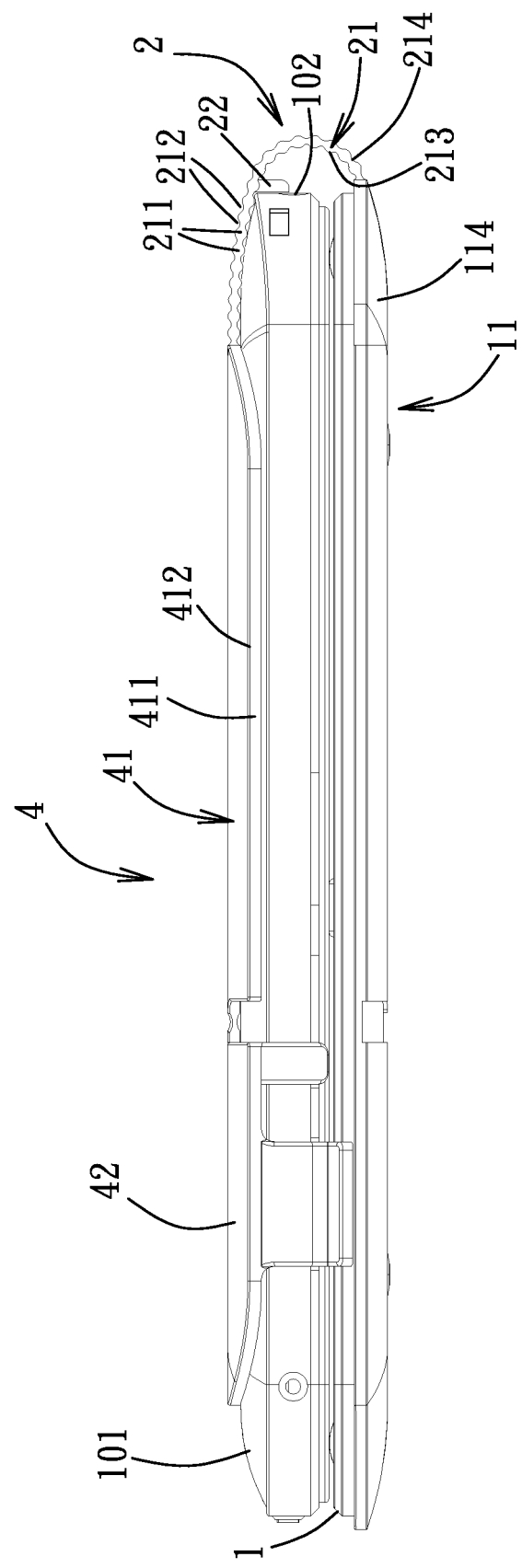
FIG. 2 is an assembled schematic view of FIG. 1 in a folded state.
Figure 3:
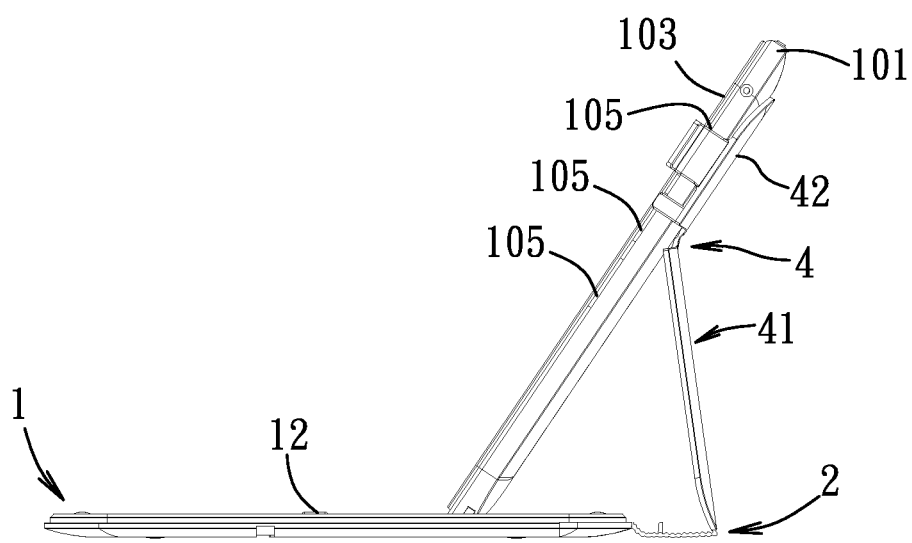
FIGS. 3 to 5 are schematic side views of the first embodiment in an unfolded state, illustrating the electronic device in different inclination angles, respectively.
Figure 4:
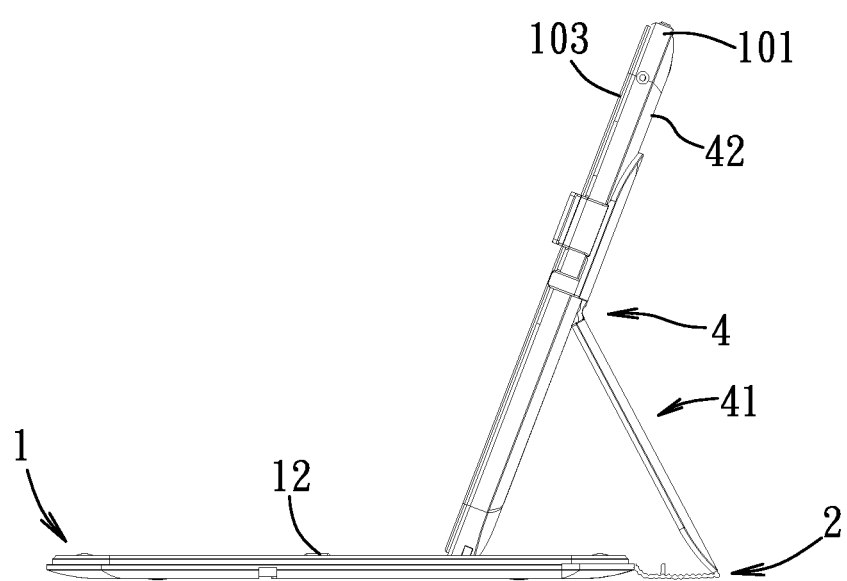
Figure 5:
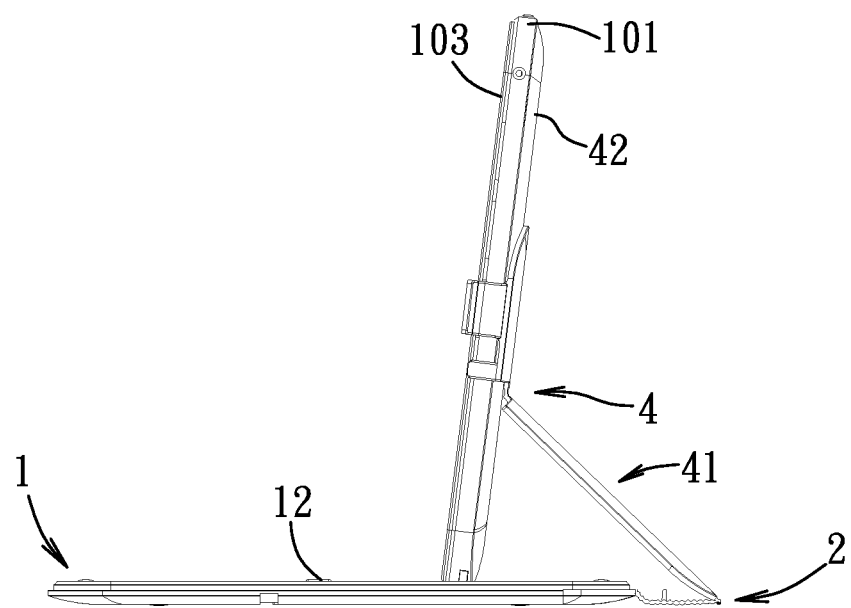

With reference to FIG. 3, when the supporting assembly 4 is moved relative to the keyboard 1 to the unfolded state, the supporting assembly 4 is lifted to stand relative to the keyboard, and a bottom end of the first panel 41 is in contact with a flat surface where the keyboard 1 is placed. Further, the first panel 41 extends inclinedly and frontwardly relative to the keyboard 1 for supporting the electronic device 101. The second panel 42 along with the electronic device 101 extends inclinedly and rearwardly relative to the first panel 41. At this time, the electronic device 101 abuts against the keyboard 1, is located rearwardly of the keys 12, and the display surface 103 thereof faces frontwardly. As shown in FIG. 2, when the supporting assembly 4 is in the folded state, the supporting assembly 4 along with the electronic device 101 moves downwardly and covers the keyboard 1. The first and second panels 41, 42 are flush with each other and lie on the same plane at this state.

With reference to FIG. 1, the electrical connector 3 is disposed in the housing 11 of the keyboard 1. When the electronic device 101 is abuttingly supported on the keyboard 1, the electrical connector 3 can mate with the electronic device 101 to establish an electrical connection therewith. As such, an operation signal of the keyboard 1 can be transmitted to the electronic device 101.

Hence, an advantage of this invention resides in that by using the supporting assembly 4 in conjunction with the connecting unit 2, the effect of supporting the electronic device 101 can be achieved. Further, when the electronic device 101 is not in use, the supporting assembly 4 along with the electronic device 101 can be moved to cover the keyboard 1 to simulate a notebook computer, so that an assembly of the expandable keyboard device 100 and the electronic device 101 can be conveniently carried. Moreover, the supporting assembly 4 has a simpler and lighter structure compared to the conventional ones.

Additionally, the electrical connector 3 is provided in the housing 11 of the keyboard 1 to mate with the electronic device 101 when the latter is in a supporting state, so that the convenience of use can be enhanced. Furthermore, because the electrical connector 3 is directly disposed in the housing 11, wire handling difficulties can be reduced.

Figure 6:
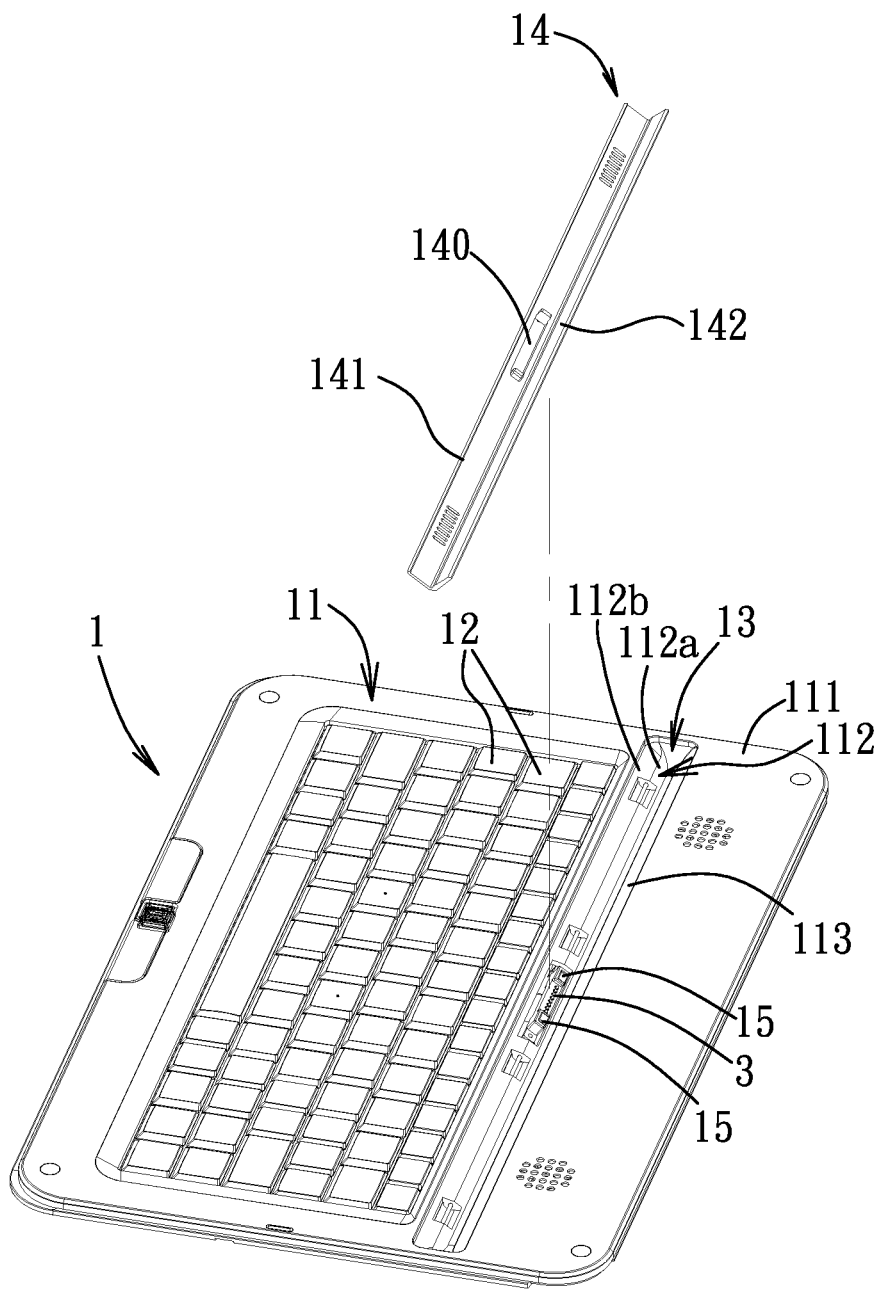
FIG. 6 is an exploded perspective view of a keyboard of the first embodiment.

With reference to FIGS. 3, 6, and 7, in this embodiment, the housing 11 has a top face 111, and a receiving groove 13 extending downwardly from the top face 111. The receiving groove 13 is located rearwardly of the keys 12, and extends in a left-right direction. The electrical connector 3 is disposed movably in the receiving groove 13. When the electronic device 101 abuts against the keyboard 1, a bottom end 102 of the electronic device 101 is disposed within the receiving groove 13, and is mated with the electrical connector 3.

Concretely speaking, the housing 11 is provided with a slant opening (112c) to communicate the receiving groove 13 with an interior of the housing 11. The electrical connector 3 is connected electrically to a circuit board of the housing 11 through a cable 31, and extends through the slant opening (112c) into the receiving groove 13. The slant opening (112c) has a width larger than that of the electrical connector 3, so that the electrical connector 3 is movable within the slant opening (112c) to a certain degree.

Another advantage of this invention resides in that, through the mobility of the electrical connector 3, when the electronic device 101 is adjusted so as to be supported at an inclination angle, the electrical connector 3 can move along with the electronic device 101 to maintain and stabilize connection with the same.

The keyboard 1 further includes a bearing plate 14 disposed in the receiving groove 13 and pivoted to the housing 11. The electrical connector 3 is engaged to the bearing plate 14. Concretely speaking, the bearing plate 14 has an engaging hole 140 to receive engagingly the electrical connector 3 so that the bearing plate 14 can move along with the electrical connector 3 in the receiving groove 13. When the bottom end 102 of the electronic device 101 extends into the receiving groove 13, the bottom end 102 abuts against the bearing plate 14 and is supported by the same.

Figure 9:
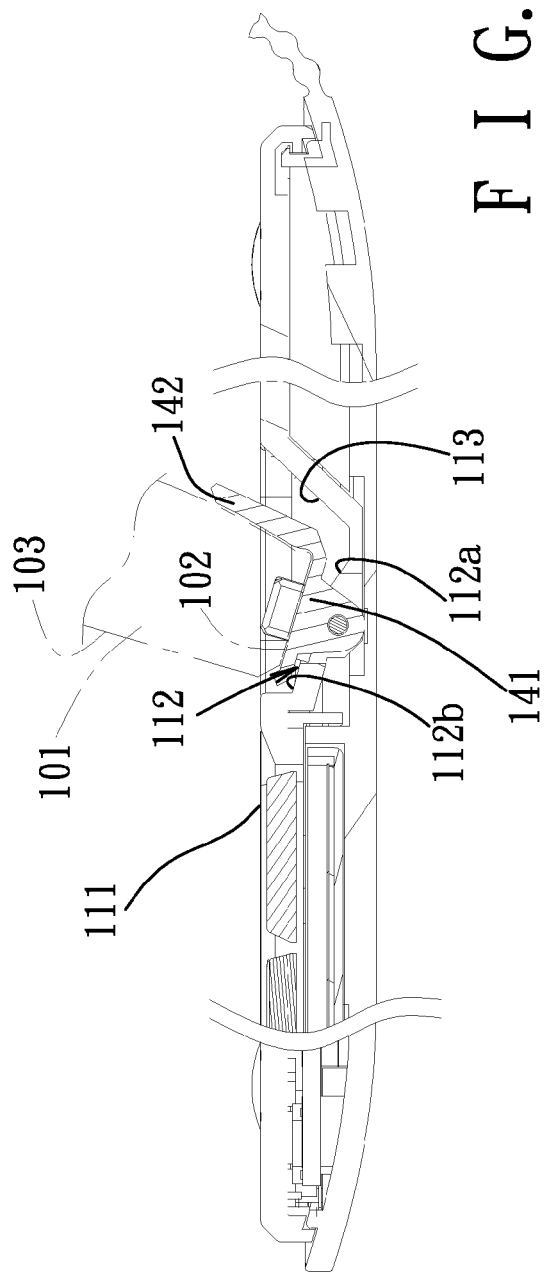
FIG. 9 is a view similar to FIG. 8, but illustrating the bearing plate abutting against a first inclined face of the keyboard.

With reference to FIGS. 6, 8, and 9, the housing 11 further has a first inclined wall 112 and a second inclined wall 113 both connected to and disposed lower than the top face 111. The first and second inclined walls 112, 113 have bottom ends connected to each other, and top ends spaced apart from each other. In other words, the first and second inclined walls 112, 113 are connected to each other to form a substantially V-shaped structure that defines the receiving groove 13. Further, the first inclined wall 112 is more proximate to the keys 12 than the second inclined wall 113, and includes a first plate section (112a) connected to the second inclined wall 113, and a second plate section (112b) connected to the first plate section (112a) and the top face 111 and having a slope smaller than that of the first plate section (112a). The opening (112c) (see FIG. 7) is formed in the first inclined wall 112.

The bearing plate 14 of this embodiment also has a substantially V-shaped structure, and includes interconnected first and second bearing plate portions 141, 142. The engaging hole 140 is formed in the first bearing plate portion 141. When the bearing plate 14 is pivotally disposed in the receiving groove 13, the first inclined wall 112 faces the first bearing plate portion 141, and the second inclined wall 113 faces the second bearing plate portion 142. When the electronic device 101 is supported on the bearing plate 14, the electronic device 101 has the bottom end 102 abutting against the first bearing plate portion 141, and a back side abutting against the second bearing plate portion 142. As shown in FIG. 8, in this embodiment, when the second bearing plate portion 142 abuts against the second inclined wall 113, the electronic device 101 is supported at an inclination angle of 125° (that is, an included angle between the display surface 103 and the housing 11). As shown in FIG. 9, when the first bearing plate portion 141 abuts against the second plate section (112b) of the first inclined wall 112, the electronic device 101 is supported at an inclination angle of 105°.

A yet another advantage of this invention resides in that, because the electrical connector 3 is engaged to the engaging hole 140 in the first bearing plate portion 141 of the bearing plate 14 which supports the electronic device 101, mating between the electrical connector 3 and the electronic device 101 can be further ensured when the electronic device 101 is adjusted to a desired inclination angle.

The keyboard 1 further includes one or more magnetic elements 15 proximate to the electrical connector 3 and may be connected to the electrical connector 3 or the bearing plate 14. Especially, when the bottom end 102 of the electronic device 101 is made of metal, as the bottom end 102 nears the electrical connector 3, through the magnetic force of the magnetic elements 15, the bottom end 102 is pulled magnetically to abut against the bearing plate 14 and mate with the electrical connector 3. The magnetic elements 15 not only can function as a guide, but also can reduce the trouble of aligning components. Hence, the stability of connection between the electrical connector 3 and the electronic device 101 can be further enhanced.

With reference to FIGS. 1 to 3, the connecting unit 2 includes a flexible sheet 21 made of rubber and having a plurality of alternately arranged horizontally extending ridges 211 and grooves 212. That is, two opposite sides 213, 214 of the flexible sheet 21 each have a wavy surface.

In this embodiment, the flexible sheet 21 has a stop piece 22 projecting from the side 213 thereof. The stop piece 22 abuts against the bottom end 102 of the electronic device 101 when the supporting assembly 4 along with the electronic device 101 is in the folded state to assist in positioning the electronic device 101. At this time, the side 213 of the flexible sheet 21 faces the keyboard 1 and the electronic device 101.

Referring again to FIGS. 1 and 2, the first panel 41 includes a panel body 411 and a pad body 412 connected to the panel body 411. The pad body 412 is made of rubber, and is connected integrally as one piece with the flexible sheet 21. The second panel 42 is connected to the pad body 412. The connecting unit 2 is also connected to the housing 11. Concretely speaking, during making of the first panel 41, the panel body 411 which is a metal, for example, is formed with the pad body 412 through an insert injection molding process. During the insert injection molding, the second panel 42 and a bottom connecting piece 114 of the housing 11 are simultaneously inserted into the mold, so that when the pad body 412 is formed, it is connected to the second panel 42. Further, during the insert injection molding, the flexible sheet 21 is formed integrally as one piece with the pad body 412. The flexible sheet 21 is further connected to the bottom connecting piece 114. Hence, the first panel 41 is connected to the bottom connecting piece 114 and the second panel 42. When the bottom connecting piece 114 is assembled to the housing 11, the flexible sheet 21 is connected to the housing 11.

From the aforesaid description, still yet another advantage of this invention resides in that, by using the insert injection molding process with simple structure and means, connection between the keyboard 1 and the supporting assembly 4 can be achieved.

Figure 10:
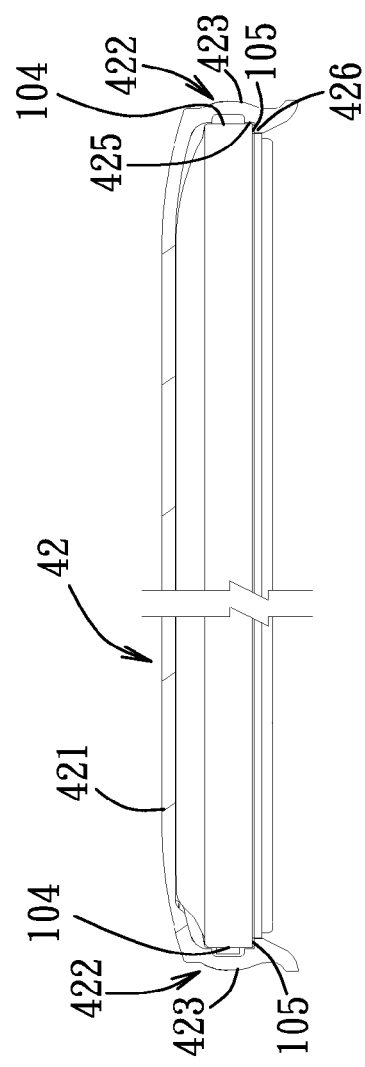
FIG. 10 is a sectional view, illustrating how the electronic device is sandwiched between two clamping structures of a second panel.
Figure 11:
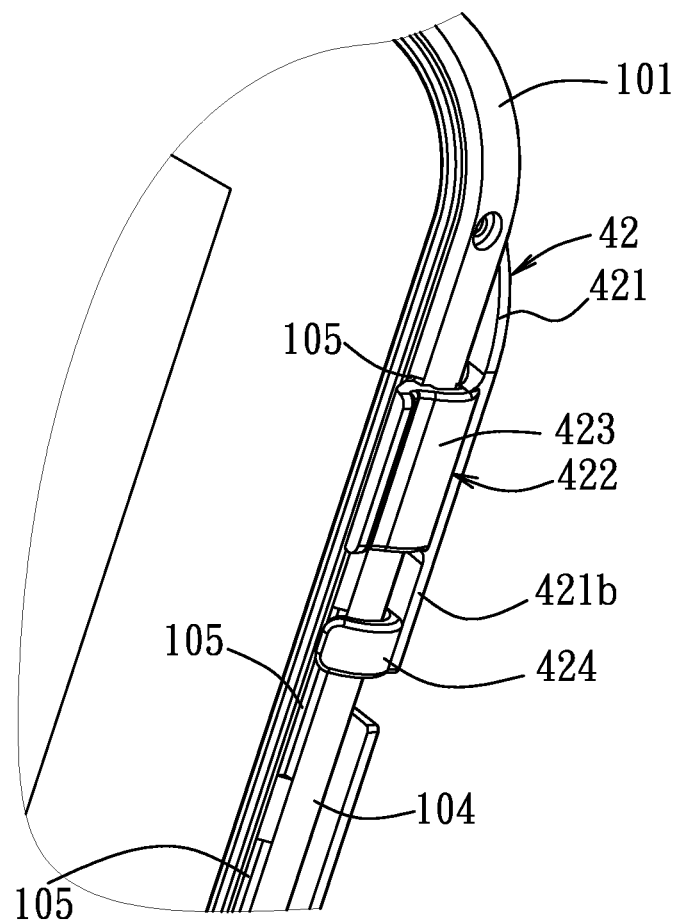
FIG. 11 is a fragmentary perspective view, illustrating the electronic device being connected to the second panel.
Figure 12:
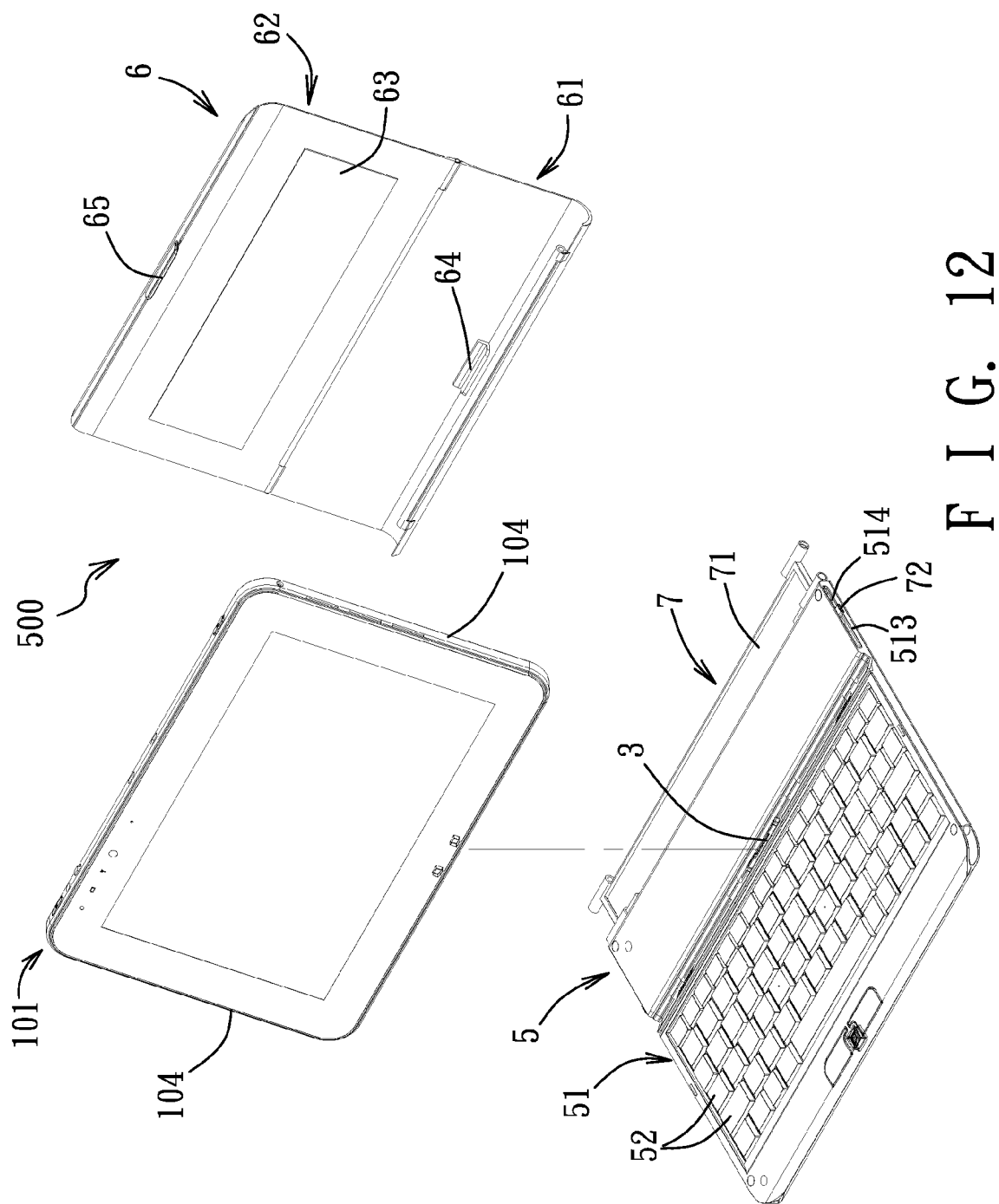
FIG. 12 is an exploded perspective view of an electronic device and an expandable keyboard device according to the second embodiment of this invention.
Figure 13:
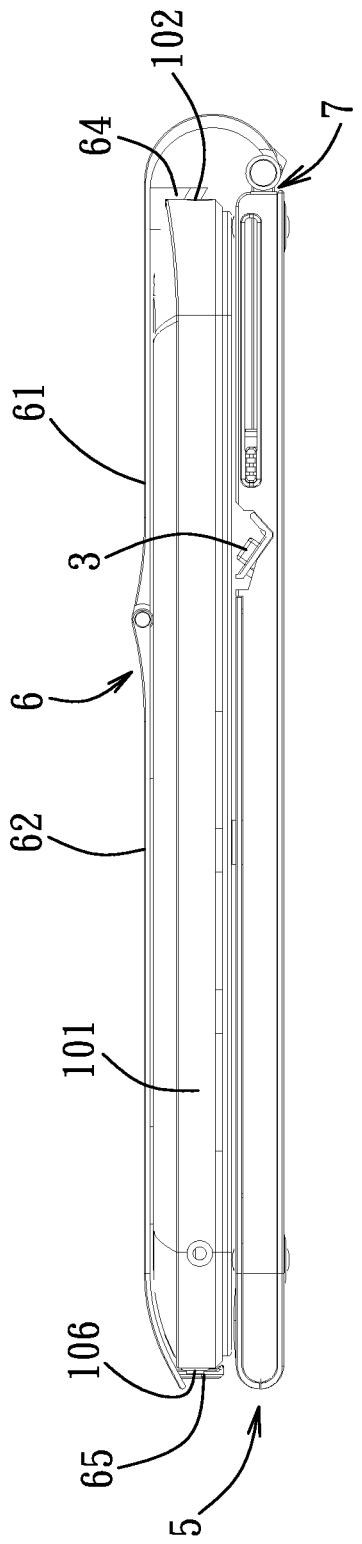
FIG. 13 is a schematic side view of the second embodiment in an assembled folded state.

With reference to FIGS. 1, 10, and 11, the second panel 42 includes a plate body 421 and two clamping structures 422. The plate body 421 is substantially flat, is connected to the pad body 412 (see FIG. 2), and has left and right sides (421b). The clamping structures 422 are disposed on the left and right sides (421b) of the plate body 421 to clamp therebetween the electronic device 101 when the latter is connected to the second panel 42. That is, the clamping structures 422 abut respectively against left and right sides 104 of the electronic device 101.

Each clamping structure 422 includes a clamping arm 423 and an auxiliary clamping arm 424 projecting frontwardly from a respective side (421*b*) of the plate body 421 and spaced apart from each other in a top-bottom direction. Each of the left and right sides 104 of the electronic device 101 is formed with a plurality of spaced-apart engaging slots 105 (see FIGS. 3 and 11) arranged in a top-bottom direction. The clamping arm 423 of each clamping structure 422 has an inner face 425 for facing the respective left or right side 104 of the electronic device 101, and a projection 426 formed on the inner face 425. The clamping arms 423 of the clamping structures 422 further have curved flared ends distal from the plate body 421 and extending away from each other to facilitate pulling operation thereof. The auxiliary clamping arm 424 of each clamping structure 422 has a curved shape. When the clamping structures 422 abut respectively against the left and right sides 104 of the electronic device 101, the projection 426 of the clamping arm 423 of each clamping structure 422 engages one of the engaging slots 105 in the respective left or right side 104 of the electronic device 101.

With reference to FIGS. 3 to 6, because the projection 426 of the clamping arm 423 of each clamping structure 422 can engage selectively one of the engaging slots 105 in the respective left or right side 104 of the electronic device 101, which are arranged at different heights, the first panel 41 of the supporting assembly 4 can support the electronic device 101 at different heights, thereby varying the inclination angle of the display surface 103 relative to the top face 111 of the housing 11 of the keyboard 1. In this exemplary, each of the left and right sides 104 of the electronic device 101 is provided with three engaging slots 105. This is so configured so that when the projection 426 of the clamping arm 423 engages each of the engaging slots 105 in the respective side 104 of the electronic device 101, the electronic device 101 can be positioned selectively at an inclination angle of 105°, 115°, or 125° relative to the keyboard 1.

When adjustment of the inclination angle of the electronic device 101 is desired, the clamping arms 423 of the clamping structures 422 are pulled outwardly to move the projections 426 away from the corresponding engaging slots 105. Because the auxiliary clamping arms 424 of the clamping structures 422 still abut against the sides 104 of the electronic device 101, the electronic device 101 can be slid relative to the auxiliary clamping arms 424 until the projections 426 of the clamping arms 423 align against another corresponding ones of the engaging slots 105, after which the clamping arms 423 are released so that the projections 426 can engage the selected ones of the engaging slots 105, and the electronic device 101 is adjusted to the desired inclination angle.

Further still another advantage of this invention resides in that, aside from the simple structure and easy operation of the clamping structures 422, because each clamping structure 422 includes the clamping arm 423 and the auxiliary clamping arm 424, the electronic device 101 can be easily adjusted to a desired inclination angle and can be prevented from accidentally falling out from the support of the supporting assembly 4.

Referring to FIGS. 12 to 16, an expandable keyboard device 500 according to the second embodiment of the present invention is shown to be similar to the first embodiment. Particularly, the expandable keyboard device 500 comprises a keyboard 5, an electrical connector 3, a supporting assembly 6, and a connecting unit 7. However, the difference between the first and second embodiments resides in the structures of the supporting assembly 6 and the connecting unit 7.

In this embodiment, the connecting unit 7 includes a slide plate 71 disposed slidably in the housing 51 of the keyboard 5. The supporting assembly 6 similarly includes first and second panels 61, 62. The first panel 61 is pivoted to the slide plate 71, and is movable along with the slide plate 71 so as to be displaced relative to the housing 51. The supporting assembly 6 can be similarly operated to move relative to the keyboard 5 between folded and unfolded states. In the unfolded state, the electronic device 101 is supported by the supporting assembly 6 such that the bottom end 102 of the electronic device 101 abuts against the keyboard 5 and the display surface 103 thereof faces frontwardly. Further, the electronic device 101 is located rearwardly of the keys 52, and is mated to the electrical connector 3. Moreover, because the supporting assembly 6 moves along with the slide plate 71 in a forward and rearward direction relative to the housing 51, the position of the first panel 61 relative to the housing 51 can be changed so as to change an inclination angle of the electronic device 101. In the folded state, the supporting assembly 6 along with the electronic device 101 covers the keyboard 5.

Concretely speaking, in this embodiment, the first and second panels 61, 62 are connected pivotally to each other. However, the connection is not limited thereto. As long as the first and second panels 61, 62 are rotatable relative to each other to change an included angle therebetween, any connecting method is acceptable. Further, the position of the connecting unit 7 on the keyboard 5 is such that, regardless of how the connecting unit 7 moves forward and rearward, when the first panel 61 supports the electronic device 101 in the unfolded state, the electronic device 101 is constantly located rearwardly of the keys 52.

Hence, an advantage of this embodiment resides in that, because the connecting unit 7 is slidable forward and rearward relative to the keyboard 5, the connecting unit 7 cooperates with the supporting assembly 6 to provide a different kind of structure that can achieve the effect of changing the supported inclination angle of the electronic device 101. When the electronic device 101 is not in use, the electronic device 101 along with the supporting assembly 6 can cover the keyboard 5. Hence, an assembly of the expandable keyboard device 500 and the electronic device 101 can be conveniently carried.

Further, in this embodiment, the second panel 62 has a flat structure. The supporting assembly 6 further includes an adhesive layer 63 provided on a front side of the second panel 62, a lower abutment piece 64 provided on the first panel 61 in proximity to a bottom end thereof, and an upper abutment piece 65 provided on the second panel 62 in proximity to a top end thereof. In this embodiment, the adhesive layer 63 is a releasable adhesive that connects releasably the electronic device 101 to the second panel 62. When the electronic device 101 is not in use, it can be easily detached from the second panel 62. The upper abutment piece 65 is used for abutting against a top end 106 of the electronic device 101. The lower abutment piece 64 is used for abutting against the bottom end 102 of the electronic device 101 when the supporting assembly 6 is in the folded state, and cooperates with the upper abutment piece 65 to position therebetween the electronic device 101.

Moreover, in this embodiment, each of the first and second panels 61, 62 can have a width smaller than that of the electronic device 101, so that when the electronic device 101 is supported by the supporting assembly 6, the first and second panels 61, 62 will not exceed the left and right sides 104 of the electronic device 101, thereby enhancing the appearance of this invention.

With reference to FIGS. 17 to 20, the housing 51 of the keyboard 5 has a rear end 511 and a slide groove 512 that extends inwardly and frontwardly from the rear end 511. The housing 51 includes interconnected upper and lower housing parts 53, 54. The upper housing part 53 includes an upper frame 531 that is recessed to expose the keys 52, and an upper panel 517 disposed rearwardly of the upper frame 531 and having left and right sidewalls 513. The upper panel 517 and the lower housing part 54 cooperatively define the slide groove 512. Each sidewall 513 has an inner wall face 5131 facing the slide groove 512, an outer wall face 5132 opposite to the inner wall face 5131, an elongated through slot 514 extending through the inner and outer wall faces 5131, 5132 and communicating with the slide groove 512, a plurality of spaced-apart elongated ribs 510 projecting inwardly from the inner wall face 5131 in proximity to the through slot 514, and a plurality of spaced-apart positioning recesses 516 arranged along the through slot 514. Each of the positioning recesses 516 is defined by two adjacent ones of the ribs 510.

Figure 19:
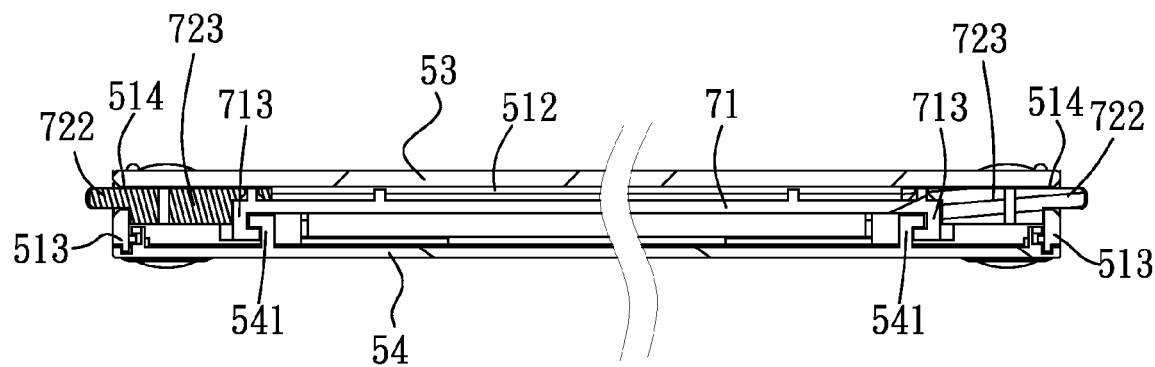
FIG. 19 is another fragmentary sectional view of the expandable keyboard device of the second embodiment, illustrating a housing and two resilient engaging members thereof.

With reference to FIG. 19, to permit smooth sliding movement of the slide plate 71 within the slide groove 512, the slide plate 71 and the lower housing part 54 are provided with complementary guide rails 713, 541 extending in a front-rear direction. Through this configuration, the slide plate 71 can be guided to move slidably relative to the lower housing part 54. Alternatively, the guide rails may be provided on the slide plate 71 and the upper housing part 53, respectively.

Additionally, in this embodiment, the housing 51 of the keyboard 5 has a structure similar to that of the first embodiment. Particularly, the housing 51 has first and second inclined walls 519, 520 cooperatively defining a receiving groove 518. The first and second inclined walls 519, 520 and the receiving groove 518 are provided on the upper housing part 53. Further, the structural cooperation between the electrical connector 3 and the bearing plate 55 is similar to that described in the first embodiment, so that a detailed description thereof is dispensed herewith.

Figure 17:
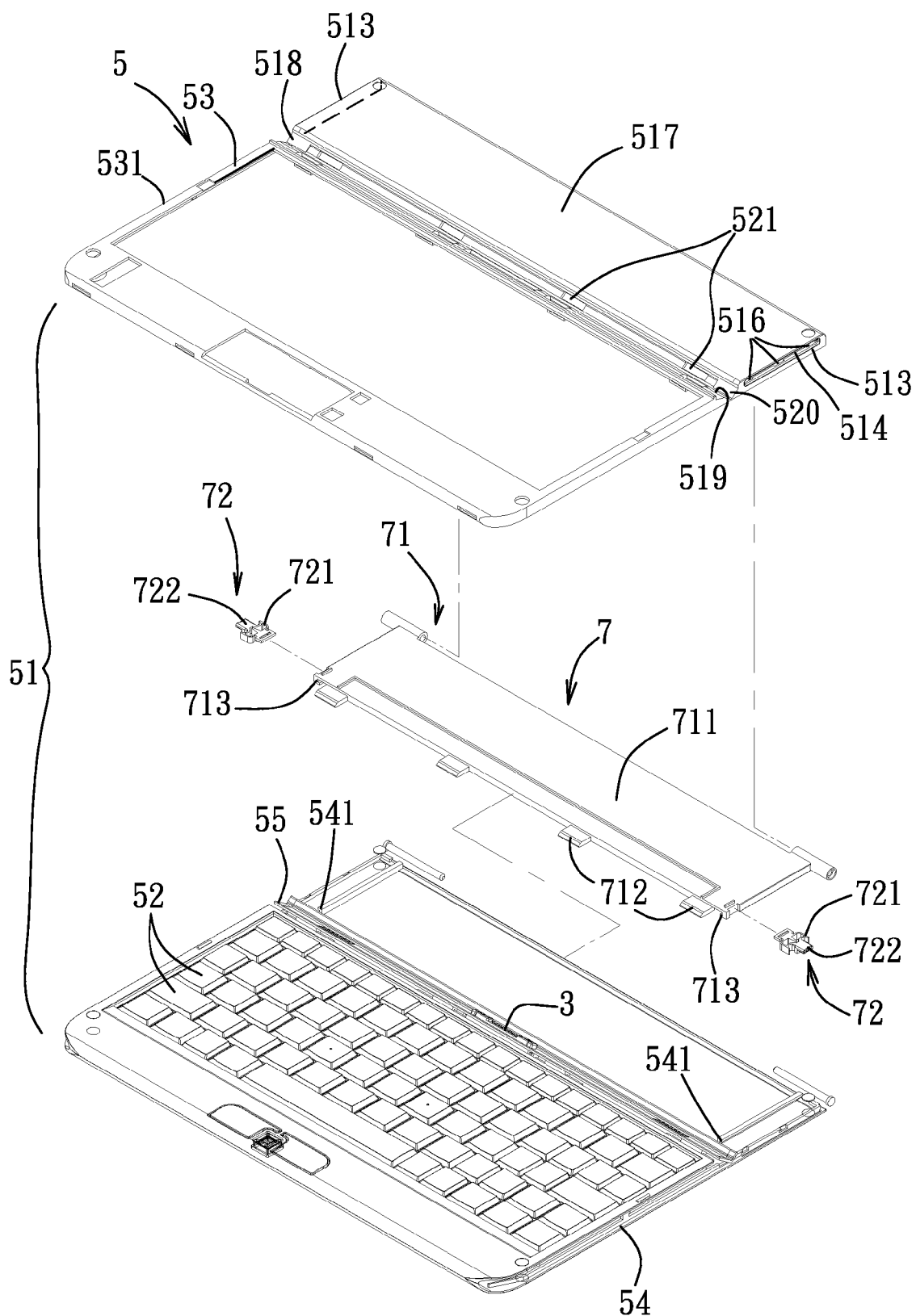
FIG. 17 is an exploded perspective view of the expandable keyboard device of the second embodiment.
Figure 20:
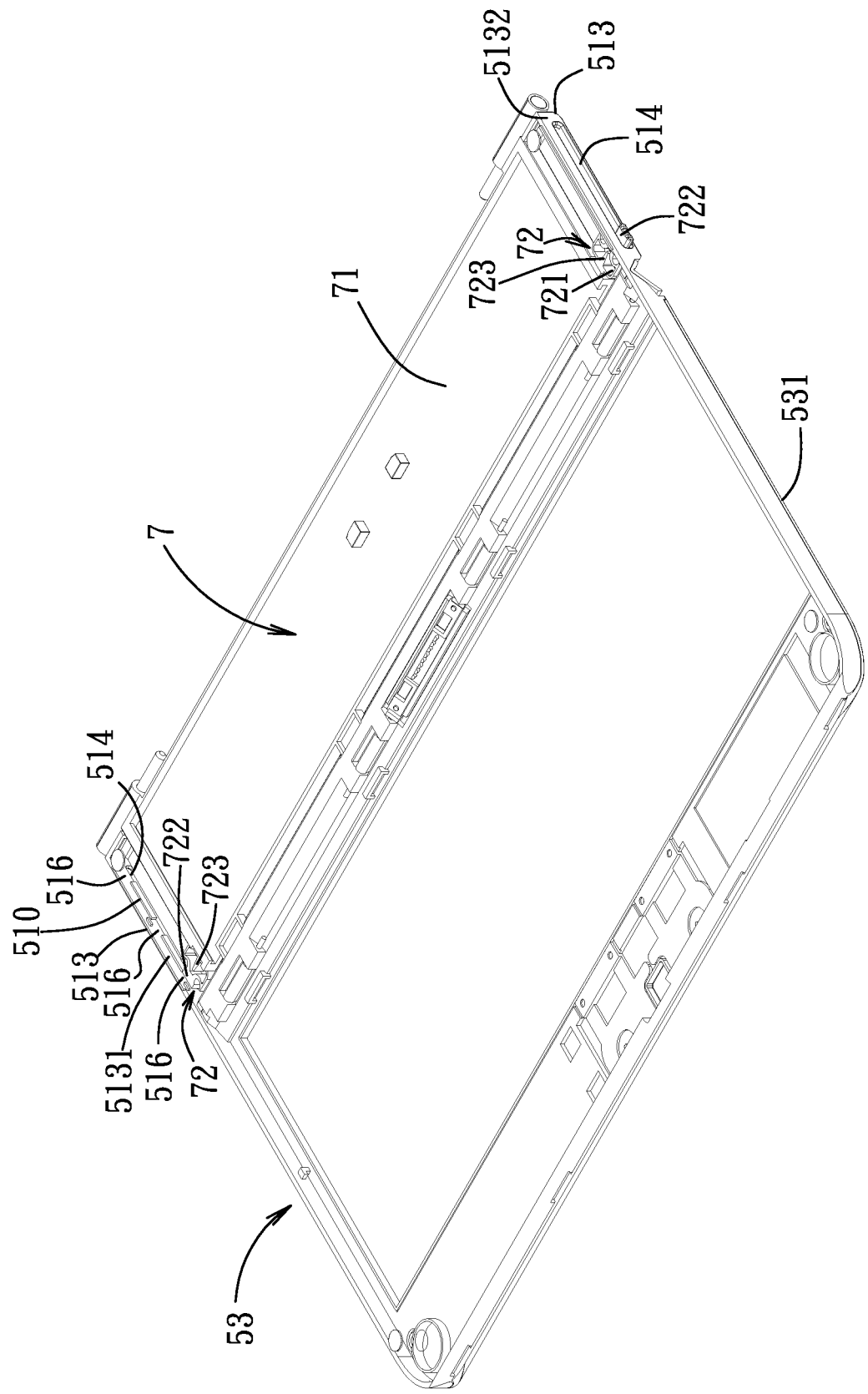
FIG. 20 is a bottom perspective view of an upper housing part of the expandable keyboard device of the second embodiment.
Figure 21:
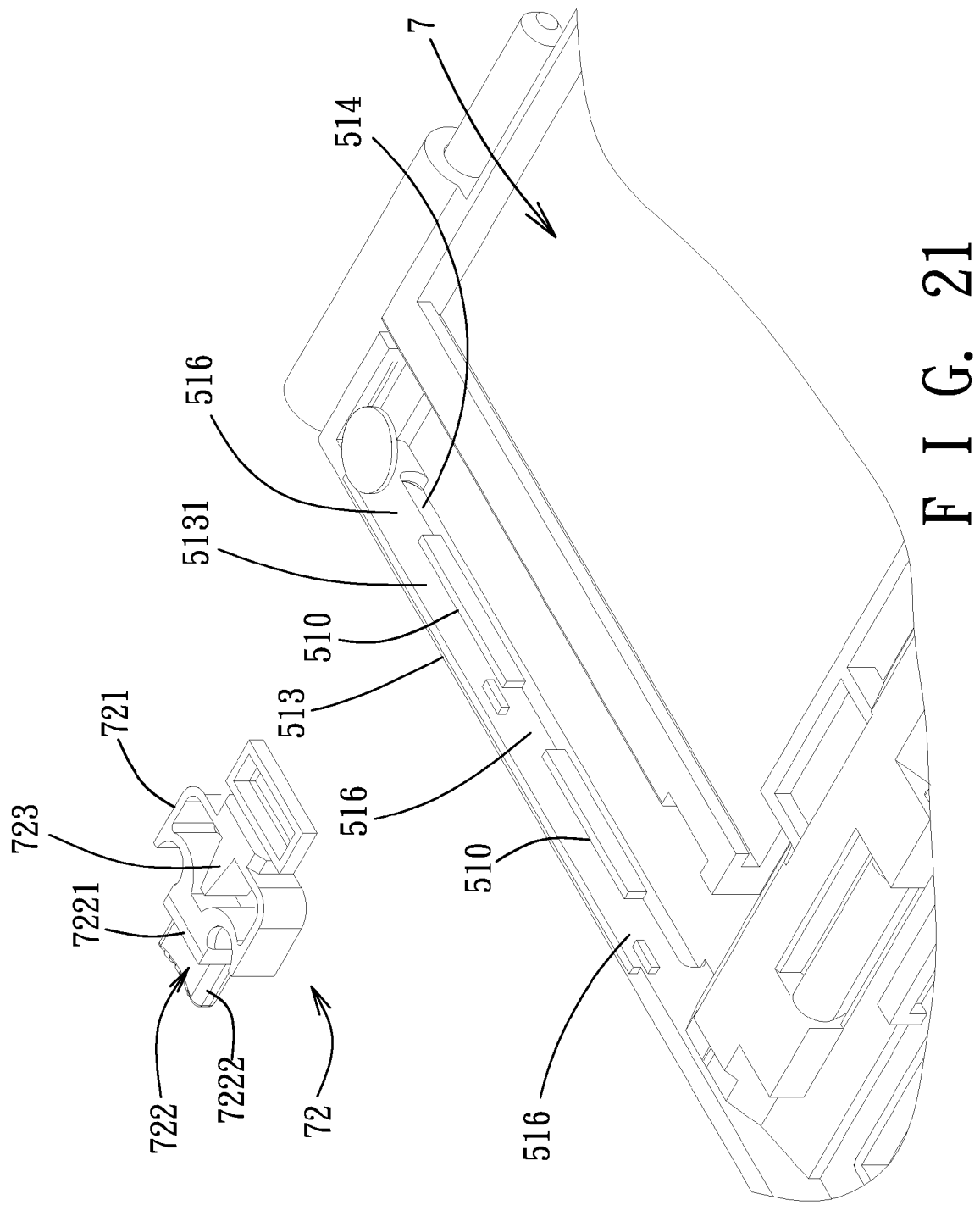
FIG. 21 is a fragmentary enlarged perspective view of FIG. 20.

With reference to FIGS. 17, 19 and 20, the connecting unit 7 further includes two resilient engaging elements 72 disposed respectively on left and right ends of the slide plate 71. The resilient engaging elements 72 are extendable respectively and resiliently through the through slots 514 in the left and right sidewalls 513 of the upper panel 517. Each resilient engaging element 72 is releasably retained in one of the positioning recesses 516 in a respective sidewall 513 of the upper panel 517 to create an interference between the connecting unit 7 and the housing 51. The interference prevents forward and rearward movement of the slide plate 71 relative to the housing 51. When the resilient engaging elements 72 are pressed inwardly via the through slots 514 to move away from the positioning recesses 516 of the respective sidewalls 513, the interference between the connecting unit 7 and the housing 51 is released, so that the slide plate 71 can slide forward and rearward in the slide groove 512 relative to the housing 51 until each resilient engaging element 72 retains in another positioning recess 516.

Concretely speaking, each resilient engaging element 72 includes a deformable portion 721 fixed to the slide plate 71, and a press portion 722 connected to and having a width smaller than that of the deformable portion 721. The press portion 722 includes a positioning section 7221, and a tongue section 7222 projecting from the positioning section 7221 through the through slot 514 so as to be exposed externally of the housing 51. When the tongue section 7222 of the press portion 722 is pressed, the positioning section 7221 is pushed away from the positioning recess 516, and the deformable portion 721 is compressed and deformed to store a returning force. When the resilient engaging element 72 moves along with the slide plate 71 to a position corresponding to another one of the positioning recesses 516, the returning force of the deformable portion 721 biases the tongue section 7222 of the press portion 722 to extend through the through slot 514 externally of the housing 51 and to position the positioning section 7221 in the corresponding positioning recess 516.

In this embodiment, the deformable portion 721 of each resilient engaging element 72 is substantially annular in shape, and each resilient engaging element 72 further includes a stud 723 projecting from an inner portion of the deformable portion 721 toward the press portion 722. When the tongue section 7222 of the press portion 722 is pressed inwardly, the positioning section 7221 of the press portion 722 moves away from the positioning recess 516 and abuts against the stud 723 so that the press portion 722 cannot be further pressed inwardly. Since the sliding movement and positioning of the slide plate 71 can be achieved through the releasable interference between the resilient engaging elements 72 and the housing 51, the tongue section 7222 of the press portion 721 must be constantly exposed from the through slot 514. To achieve this purpose, the stud 723 is provided in this embodiment so as to limit an amount of distance that the press portion 722 is moved when pressed.

With reference to FIGS. 14 to 17 and 20, further, in this embodiment, the inner wall face 5131 of each sidewall 513 is formed with three positioning recesses 516 arranged in a front-rear direction. Through this configuration, when each resilient engaging element 72 engages the frontmost one of the positioning recesses 516, as shown in FIG. 14, the electronic device 101 is supported by the first panel 61 at an inclination angle (i.e., an included angle between the display surface 103 and the housing 51) of 105°. When the resilient engaging element 72 engages the rearmost one of the positioning recesses 516, as shown in FIG. 16, the electronic device 101 is supported by the first panel 61 at an inclination angle of 125°. When the resilient engaging element 72 engages the middle one of the positioning recesses 516, as shown in FIG. 15, the electronic device 101 is supported by the first panel 61 at an inclination angle of 115°. The bearing plate 55 is configured to be movable along with the electrical connector 3 so that the bearing plate 55 which supports the bottom end 102 of the electronic device 101 and the electrical connector 3 which is connected to the electronic device 101 can move along with the electronic device 101 to different inclination angles, thereby maintaining stable connection between the electrical connector 3 and the electronic device 101.

Figure 18:
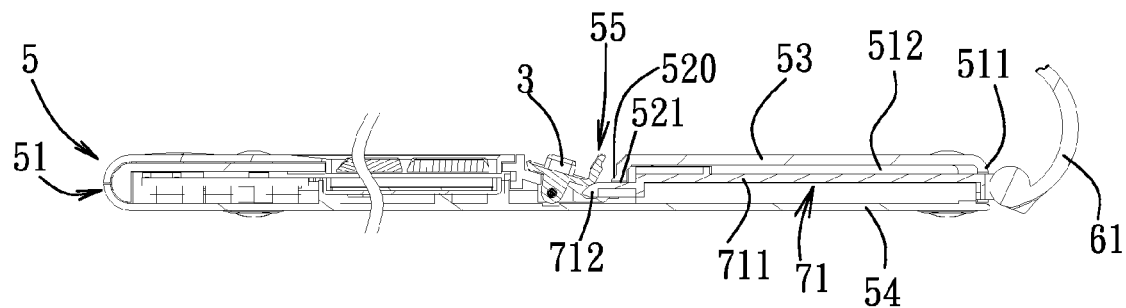
FIG. 18 is a fragmentary sectional view of the expandable keyboard device of the second embodiment, illustrating a bearing plate and a slide plate thereof.

With reference to FIGS. 14, 17 and 18, moreover, in this embodiment, the slide plate 71 includes a plate body 711 and a plurality of protrusions 712. The first panel 61 of the supporting assembly 6 is pivoted to a rear end of the plate body 711. The protrusions 712 extend forwardly from a front end of the plate body 711. The second inclined wall 520 is further formed with a plurality of apertures 521 corresponding to the protrusions 712. Through this configuration, the slide plate 71 can be pushed forwardly into the slide groove 512 until the protrusions 712 pass through the apertures 521 and extend into the receiving groove 518 to abut against the bearing plate 55. The protrusions 712 apply a frontward pressure to a back side of the bearing plate 55, the purpose of which is to stabilize the bearing plate 55 and prevent the same from rocking back and forth when not in contact with the second inclined wall 520 so that the stability of the electronic device 101 cannot be affected.

In summary, the present invention uses the supporting assembly 4, 6 in conjunction with the connecting unit 2, 7, whether by using the flexible sheet 21 or the slide plate 71 cooperating with the resilient engaging element 72, a different structure for supporting the electronic device 101 can be achieved. Further, when the supporting assembly 4, 6 is not in use, the supporting assembly 4, 6 along with the electronic device 101 covers the keyboard 1, 5 to facilitate carrying of an assembly of the expandable keyboard device 100, 500 and the electronic device 101. Hence, the object of this invention can be realized.

While the present invention has been described in connection with what are considered the most practical embodiments, it is understood that this invention is not limited to the disclosed embodiments but is intended to cover various arrangements included within the spirit and scope of the broadest interpretations and equivalent arrangements.

What is claimed is:

1. An expandable keyboard device for use in conjunction with an electronic device, the electronic device having a display surface and a bottom end, said expandable keyboard device comprising:
   a keyboard including a housing and a plurality of keys provided on said housing;
   a supporting assembly including a first panel and a second panel connected to said first panel, said second panel being adapted to connect with the electronic device, said supporting assembly being movable relative to said keyboard between an unfolded state and a folded state, said first panel extending upwardly relative to said keyboard for supporting the electronic device above said keyboard when said supporting assembly is in said unfolded state so that the bottom end of the electronic device abuts against said keyboard rearwardly of said keys and so that the display surface faces frontwardly, said second panel and the electronic device covering said keyboard when said supporting assembly is in said folded state;
   an electrical connector disposed in said housing for electrical connection with the electronic device; and
   a connecting unit interconnecting said supporting assembly and said housing, and including a slide plate slidable forward and rearward relative to said housing;
   wherein said first panel is pivoted to and movable along with said slide plate relative to said keyboard.

2. The expandable keyboard device as claimed in claim 1, wherein said housing has a rear end, a slide groove extending frontwardly from said rear end, and left and right sidewalls cooperatively defining said slide groove, one of said sidewalls being provided with a through slot that communicates with said slide groove, said one of said sidewalls having an inner wall face facing said slide groove, and a plurality of positioning recesses formed on said inner wall face and arranged along said through slot, said connecting unit further including a resilient engaging element connected to said slide plate and extendable outwardly and resiliently through said through slot, said resilient engaging element being releasably retained in one of said positioning recesses to limit sliding movement of said slide plate relative to said housing.

3. The expandable keyboard device as claimed in claim 2, wherein said resilient engaging element includes a deformable portion fixed to said slide plate, and a press portion connected to said deformable portion, said press portion being exposed through said through slot.

4. The expandable keyboard device as claimed in claim 3, wherein said deformable portion is substantially annular in shape, said resilient engaging element further including a stud projecting from said deformable portion toward said press portion to limit an amount of distance that said press portion is moved when pressed.

5. The expandable keyboard device as claimed in claim 1, wherein said supporting assembly further includes an adhesive layer provided on said second panel, and a lower abutment piece and an upper abutment piece respectively provided on said first and second panels, said adhesive layer being adapted to connect releasably the electronic device to said second panel, said upper abutment piece being adapted to abut against a top end of the electronic device, said lower abutment piece being adapted to abut against the bottom end of the electronic device when said supporting assembly is in said folded state.

6. An expandable keyboard device for use in conjunction with an electronic device, the electronic device having a display surface and a bottom end, said expandable keyboard device comprising:
   a keyboard including a housing and a plurality of keys provided on said housing, said housing having a top face, and a receiving groove extending downwardly from said top face rearwardly of said keys, said keyboard further including a bearing plate pivoted to said housing and disposed in said receiving groove for supporting the bottom end of the electronic device, said receiving groove being adapted to receive the bottom end of the electronic device when the electronic device abuts against said keyboard;
   a supporting assembly including a first panel and a second panel connected to said first panel, said second panel being adapted to connect with the electronic device, said supporting assembly being movable relative to said keyboard between an unfolded state and a folded state, said first panel extending upwardly relative to said keyboard for supporting the electronic device above said keyboard when said supporting assembly is in said unfolded state so that the bottom end of the electronic device abuts against said keyboard rearwardly of said keys and so that the display surface faces frontwardly, said second panel and the electronic device covering said keyboard when said supporting assembly is in said folded state;
   an electrical connector disposed movably in said receiving groove and adapted to mate with the bottom end of the electronic device; and
   a connecting unit interconnecting said supporting assembly and said housing, and including a slide plate slidable forward and rearward relative to said housing;
   wherein said housing further includes a first inclined wall and a second inclined wall both connected to and disposed lower than said top face, said first and second inclined walls being connected to each other to form a substantially V-shaped structure that defines said receiving groove, said first inclined wall being proximate to said keys and including a first plate section connected to said second inclined wall, and a second plate section connected to said first plate section and said top face of said housing and having a slope smaller than that of said first plate section, said bearing plate having a substantially V-shaped structure and including interconnected first and second bearing plate portions, said first inclined wall facing said first bearing plate portion, said second inclined wall facing said second bearing plate portion and being formed with an aperture, said electrical connector being engaged to said first bearing plate portion so that said bearing plate can move along with said electrical connector in said receiving groove;

wherein said first panel is pivoted to and movable along with said slide plate relative to said keyboard, said slide plate including a plate body and a protrusion protruding from said plate body toward said aperture, when said slide plate slides frontwardly relative to said housing, said protrusion extends through said aperture and abuts against said bearing plate.

* * * * *